United States Patent
Iwase et al.

(10) Patent No.: US 8,496,560 B2
(45) Date of Patent: Jul. 30, 2013

(54) STARTING CONTROL SYSTEM FOR ENGINES

(75) Inventors: Yuji Iwase, Mishima (JP); Takuma Kakinami, Toyota (JP); Atsushi Tabata, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 949 days.

(21) Appl. No.: 12/091,357

(22) PCT Filed: Oct. 26, 2006

(86) PCT No.: PCT/JP2006/321349
§ 371 (c)(1),
(2), (4) Date: Oct. 8, 2009

(87) PCT Pub. No.: WO2007/049686
PCT Pub. Date: May 3, 2007

(65) Prior Publication Data
US 2010/0048353 A1    Feb. 25, 2010

(30) Foreign Application Priority Data
Oct. 26, 2005   (JP) ................................. 2005-312069

(51) Int. Cl.
*B60K 1/02*   (2006.01)

(52) U.S. Cl.
USPC ................................................ 477/3; 477/98

(58) Field of Classification Search
USPC ................. 180/65.275, 65.285; 475/5; 477/3, 477/98
See application file for complete search history.

(56) References Cited

U.S. PATENT DOCUMENTS

| | | | |
|---|---|---|---|
| 6,018,199 A | | 1/2000 | Shiroyama et al. |
| 6,459,166 B2 * | | 10/2002 | Yanase et al. ............... 290/40 C |
| 6,842,673 B2 * | | 1/2005 | Zhang et al. .................... 701/22 |
| 7,121,975 B2 * | | 10/2006 | Tomura et al. .................... 477/2 |
| 2003/0078134 A1 | | 4/2003 | Kojima et al. |
| 2004/0259680 A1 * | | 12/2004 | Ozeki et al. ........................ 477/3 |
| 2005/0209760 A1 * | | 9/2005 | Tabata et al. .................... 701/53 |
| 2009/0088291 A1 * | | 4/2009 | Kumazaki et al. .............. 477/35 |
| 2009/0176611 A1 * | | 7/2009 | Avery .............................. 475/5 |

FOREIGN PATENT DOCUMENTS

| | | | |
|---|---|---|---|
| JP | 8-126115 | | 5/1996 |
| JP | 10-136508 | | 5/1998 |
| JP | 11-82259 | | 3/1999 |
| JP | 11-270445 | | 10/1999 |
| JP | 2003-127681 | | 5/2003 |
| JP | 2004-322761 | | 11/2004 |
| JP | 2005-82138 | | 3/2005 |
| JP | 2005-240917 | | 9/2005 |
| JP | 2005-256883 | | 9/2005 |
| JP | 2005-264762 | | 9/2005 |
| JP | 2005271706 A | * | 10/2005 |

* cited by examiner

*Primary Examiner* — Justin Holmes
*Assistant Examiner* — Huan Le
(74) *Attorney, Agent, or Firm* — Oblon, Spivak, McClelland, Maier & Neustadt, L.L.P.

(57) ABSTRACT

A starting control system that starts an engine by an electric motor, including: a starting device including a plurality of the electric motors for starting the engine; and a starting device controller that controls the starting device to prevent an occurrence of a resonance when starting the engine by the electric motor of the starting device. The starting control system can prevent an occurrence of vibration and noise in a power transmission route from an electric motor to an engine.

19 Claims, 8 Drawing Sheets

|     | C1 | C2 | B1 | B2 |
|-----|----|----|----|----|
| 1st | ○  |    |    | ○  |
| 2nd | ○  |    | ○  |    |
| 3rd | ○  | ○  |    |    |
| 4th | ○  | ○  |    |    |
| R   |    | ○  |    | ○  |
| N   |    |    |    |    |

|     | C1 | C2 | B1 | B2 | B3 |
|-----|----|----|----|----|----|
| 1st | ○  |    |    |    | ○  |
| 2nd | ○  |    |    | ○  |    |
| 3rd | ○  |    | ○  |    |    |
| 4th | ○  | ○  |    |    |    |
| 5th | ○  | ○  |    |    |    |
| R   |    | ○  |    |    | ○  |
| N   |    |    |    |    |    |

STARTING CONTROL SYSTEM FOR ENGINES

TECHNICAL FIELD

This invention relates to a starting control system for an engine, for starting the engine by an electric motor.

BACKGROUND ART

In recent years, a hybrid vehicle comprising an engine and a motor generator has been proposed for the purpose of saving a fuel for driving the engine, reducing noise resulting from a rotation of the engine, and reducing emission resulting from combustion of the fuel. In the hybrid vehicle, the engine and the motor generator are controlled on the basis of a running condition of the vehicle when the vehicle is running.

Specifically, the hybrid vehicle can be run by driving the engine in a revolution region where combustion efficiency thereof is preferable, and also by using the motor generator as a motor while halting the engine in a revolution region where the combustion efficiency of the engine is degraded. One example of a control system for a drive system thus having an engine and a motor generator is disclosed in Japanese Patent Laid-Open No. 2003-127681. According to the system disclosed in Japanese Patent Laid-Open No. 2003-127681, an output torque of the engine is transmitted to a wheel via a planetary gear mechanism, a transmission, and a differential device. The planetary gear mechanism comprises a sun gear, a ring gear and a carrier, and a crankshaft of the engine is connected with the carrier. Also, a first motor/generator is provided and a rotor thereof is connected with the sun gear. The ring gear is connected with a propeller shaft, and the propeller shaft is connected with the transmission. On the other hand, a second motor/generator is provided and a rotor thereof is connected with the propeller shaft.

Japanese Patent Laid-Open No. 2003-127681 describes that the halted engine can be started by carrying out a cranking by the torque of the first motor/generator, and then, fuel is fed to the engine and combusted to rotate the engine autonomously. However, a resonance (i.e., vibration) or noise may be amplified in a power transmission system including the first motor/generator in case of transmitting the torque of the first motor/generator to the engine.

DISCLOSURE OF THE INVENTION

The present invention has been conceived noting the technical problems thus far described, and its object is to provide a starting control system for engines capable of dampening a vibration and a noise in a transmission system from an electric motor to an engine, when starting the engine by a torque of the electric motor.

In order to achieve the above-mentioned object, according to the present invention, there is provided a starting control system for starting an engine by an electric motor, comprising a starting device including a plurality of the electric motors, and a starting device control means for controlling the starting device to prevent an occurrence of a resonance when starting the engine by a torque of the electric motor of the starting device.

The above-mentioned starting device control means includes a means for controlling the starting device to prevent an occurrence of a resonance in a power transmission route from the starting device to the engine, when starting the engine under low temperature.

The starting control system of the invention further comprises a first transmission unit to which the torque is transmitted from the engine, and clutch mechanisms arranged downstream of the first transmission unit.

The aforementioned plurality of the electric motors are connected with the first transmission unit in a power transmittable manner.

A second transmission unit is arranged downstream of the first transmission unit and the aforementioned clutch mechanisms belong to the second transmission unit.

As explained above, the plurality of electric motors are provided, and any one of the electric motors is arranged in a route between the first transmission unit and the clutch mechanism.

According to the invention, the first transmission unit includes a continuously variable transmission capable of controlling a speed change ratio thereof between an input revolution and an output revolution continuously by controlling outputs of the electric motors. Here, the aforementioned starting device includes the continuously variable transmission. On the other hand, a speed change ratio of the second transmission unit between an input revolution and an output revolution thereof can be controlled by controlling torque capacities of the clutch mechanisms.

The above-mentioned starting device control means includes a means for increasing an inertia moment in the power transmission route from the starting device to the engine, to prevent an occurrence of a resonance when starting the engine.

In addition to above, the continuously variable transmission includes a planetary gear mechanism having more than three rotary elements capable of rotating differentially among each other. The aforementioned plurality of electric motors are connected individually to the different rotary elements of the planetary gear mechanism. Meanwhile, the aforementioned starting device control means includes a means for selecting the electric motor for starting the engine to prevent an occurrence of a resonance when starting the engine.

According to the invention, the engine and the plurality of electric motors are connected individually with the plurality of the rotary elements of the planetary gear mechanism thereby arranging the engine between the electric motors in a nomographic diagram showing more than three rotary elements.

According to the invention, the first transmission unit comprises an electrical continuously variable transmission in which a speed change ratio thereof is controlled electrically and varied continuously; and the second transmission unit comprises a geared transmission in which a gear stage thereof is changed stepwise. Those electrical continuously variable transmission and geared transmission may be connected in tandem so as to input power outputted from any one of those transmissions to the other one. Additionally, a total speed change ratio may be set by both of the electrical continuously variable transmission and geared transmission.

The electrical continuously variable transmission includes a single pinion type planetary gear mechanism comprising a carrier functioning as an input element, a sun gear functioning as a reaction element, and a ring gear functioning as an output element.

On the other hand, the second transmission unit is constructed of two sets of planetary gear mechanisms and a plurality of engagement devices, and the aforementioned clutch mechanism includes a plurality of engagement devices.

In addition to above, according to the invention, the two sets of planetary gear mechanisms include a single pinion type planetary gear mechanism. The sun gears of the first and the second planetary gear mechanisms are connected with each other, and the carrier of the first planetary gear mechanism and the ring gear of the second planetary gear mechanism are connected with each other. Also, the plurality of engagement devices includes: a first clutch connecting the ring gear of the first planetary gear mechanism with the output element of the power distribution mechanism selectively; a second clutch connecting the sun gear of the first planetary gear mechanism and the sun gear of the second planetary gear mechanism with the output element of the power distribution mechanism selectively; a first brake fixing the sun gears of the first and the second planetary gear mechanisms selectively; and a second brake fixing the carrier of the second planetary gear mechanisms selectively.

The geared transmission is constructed of three sets of planetary gear mechanisms and a plurality of engagement devices, and the aforementioned clutch mechanism includes the plurality of engagement devices.

In addition to above, according to the invention, the planetary gear mechanism includes a single pinion type planetary gear mechanism; sun gears of a first and a second planetary gear mechanisms are connected with each other; a ring gear of the first planetary gear mechanism, a carrier of the second planetary gear mechanism and a carrier of a third planetary gear mechanism are connected to one another; and a ring gear of the second planetary gear mechanism and a sun gear of the third planetary gear mechanism are connected with each other. On the other hand, the engagement device comprises: a first clutch selectively connecting the ring gear of the second planetary gear mechanism and the sun gear of the third planetary gear mechanism with the electrical continuously variable transmission; a second clutch selectively connecting the sun gears of the first and the second planetary gear mechanisms with the electrical continuously variable transmission; a first brake selectively fixing the sun gears of the first and the second planetary gear mechanisms; a second brake selectively fixing the carrier of the first planetary gear mechanism; and a third brake selectively fixing the ring gear of the third planetary gear mechanism.

According to the invention, the starting device thus is controlled to prevent an occurrence of a resonance in a power transmission route including the starting device when starting the engine by the electric motor of the starting device. Therefore, an occurrence of a resonance or a noise in a power transmission route including the starting device can be prevented.

In addition to the above advantage, according to the invention, an occurrence of a resonance or a noise in a power transmission route can also be prevented in case of starting the engine under low temperature.

In addition to the above advantage, as explained above, the engine torque is transmitted to the first transmission unit, and the clutch mechanisms are arranged downstream of the first transmission unit.

In addition to the above advantage, the torque of the electric motor is transmitted to the engine through the first transmission unit.

As explained above, the second transmission unit is arranged downstream of the first transmission unit, and the second transmission unit comprises the clutch mechanisms. Therefore, an occurrence of a resonance or a noise in a power transmission route including the starting device can be prevented by controlling the second clutch.

According to the invention, the plurality of electric motors is arranged. Therefore, a torque of one of the electric motors is transmitted to the engine via the route between the first transmission unit and the clutch mechanisms.

According to the invention, the engine torque is transmitted to the wheel through the first and the second transmission units after the engine is started. Also, a speed change ratio of the first transmission unit between an input revolution and an output revolution thereof can be controlled continuously by controlling outputs of the electric motors. That is, the electric motors have a function to start the engine, as well as a function to control a speed change ratio of the first transmission unit. On the other hand, a speed change ratio of the second transmission unit between an input revolution and an output revolution thereof can be controlled by engaging and releasing the engagement devices.

In addition to the above advantage, according to the invention, an inertia moment in the power transmission route from the starting device to the engine is increased to prevent an occurrence of a resonance when starting the engine.

In addition to the above advantage, according to the invention, the electric motor can be selected to start the engine. Also, an inertia moment or an inertia torque can be adjusted arbitrarily by varying a ratio between revolution frequencies of the rotary elements of the planetary gear mechanism. Therefore, an occurrence of a resonance can be prevented certainly.

According to the invention, moreover, the engine is arranged between the electric motors in a nomographic diagram showing more than three rotary elements of the planetary gear mechanism. Therefore, the engine can be started by both torques of the electric motors by driving both of the electric motors. For this reason, an inertia moment of the starting device can be increased so that an occurrence of a resonance in the power transmission route can be prevented certainly.

BEST MODE FOR CARRYING OUT THE INVENTION

Figure 2:
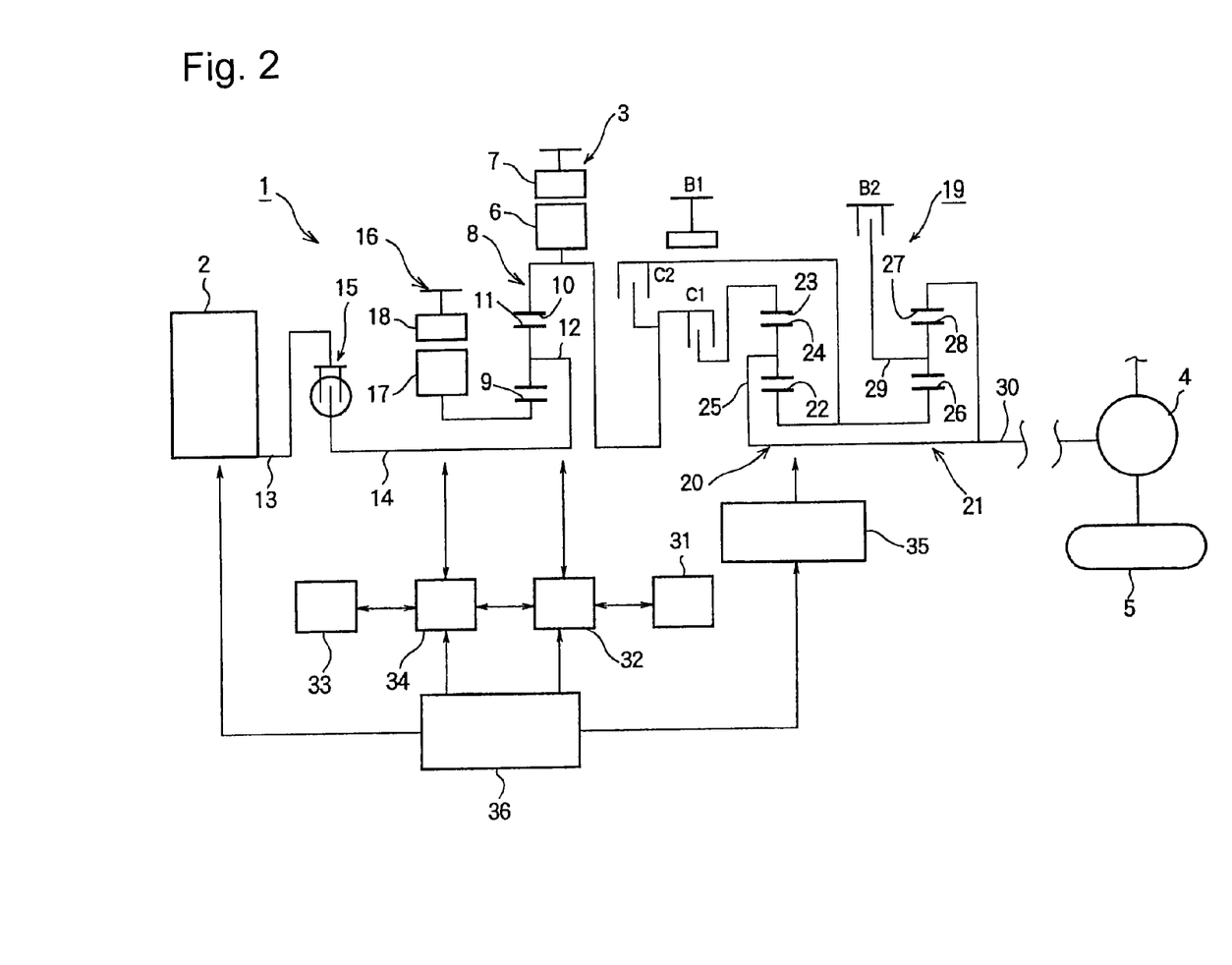
FIG. 2 is a schematic diagram showing a power train of a hybrid vehicle and a control line thereof to which the invention is applied.

Next, the present invention will be explained more specifically with reference to the accompanying drawings. FIG. 2 is a skeleton diagram showing one example of a power train of a hybrid vehicle to which the invention is applied. There are provided an engine 2 and a motor generator 3 (MG2) functioning as prime movers of a vehicle 1. The engine 2 and the motor generator 3 (MG2) are connected with a wheel 5 through a differential mechanism 4. The engine 2 is a power unit converting a thermal energy into a kinetic energy by burning a fuel. For example, an internal combustion engine such as a gasoline engine, a diesel engine, an LPG engine and so on can be used as the engine 2. The motor generator 3 comprises a rotor 6 and a stator 7. The motor generator 3 converts electric energy into mechanical energy, and converts mechanical energy into electrical energy. That is, the motor generator 3 functions as a motor (i.e., power generating function) and also functions as a generator (i.e., regenerating function).

A power distribution mechanism 8 is arranged on a route from the engine 2 to the differential mechanism 4. The power distribution mechanism 8 is composed mainly of a single pinion type planetary gear mechanism. Specifically, the power distribution mechanism 8 comprises: a sun gear 9 and a ring gear 10 arranged coaxially; and a carrier 12, which holds a pinion gear 11 meshing with the sun gear 9 and the ring gear 10 in a rotatable and revolvable manner. A crankshaft 13 of the engine 2 and an input shaft 14 are arranged coaxially, and those shafts are connected in a power transmittable manner through a damper mechanism 15. As explained later, the power distribution mechanism 8 is a continuously variable transmission capable of controlling a speed change ratio thereof electrically. Also, the carrier 12 is connected with the input shaft 14 to rotate integrally therewith. On the other hand, another motor generator 16 (MG1) is provided between the engine 2 and the power distribution mechanism 8 in an anteroposterior direction of the vehicle 1. The motor generator 16 also comprises a rotor 17 and a stator 18.

The motor generator 16 also converts electric energy into mechanical energy, and converts mechanical energy into electrical energy. That is, the motor generator 16 also functions as a motor (i.e., power generating function) as well as a generator (i.e., regenerating function). The rotor 17 of the motor generator 16 is connected with the sun gear 9 in a power transmittable manner. In other words, the rotor 17 and the sun gear 9 are connected to rotate integrally. Also, the rotor 6 of the motor generator 3 is connected with the ring gear 10 in a power transmittable manner. In other words, the rotor 6 and the ring gear 10 are connected to rotate integrally. Thus, the vehicle 1 comprises two kinds of prime movers having different principles of power generation, such as the engine 2, and the motor generators 3 and 16.

A transmission 19 is arranged on a route from the ring gear 10 of the power distribution mechanism 8 to the differential 4. The transmission 19 is a geared transmission capable of controlling a ratio between an input revolution and an output revolution, i.e., a gear stage thereof stepwise (i.e., discontinuously). The transmission 19 comprises two sets of planetary gear mechanisms, specifically, a first planetary gear transmission mechanism 20 and a second planetary gear transmission mechanism 21. The first planetary gear transmission mechanism 20 is a single pinion type planetary gear mechanism comprising: a sun gear 22 and a ring gear 23 arranged coaxially; and a carrier 25, which holds a pinion gear 24 meshing with the sun gear 22 and the ring gear 23 in a rotatable and revolvable manner. On the other hand, the second planetary gear mechanism 21 is also a single pinion type planetary gear mechanism comprising: a sun gear 26 and a ring gear 27 arranged coaxially; and a carrier 29, which holds a pinion gear 28 meshing with the sun gear 26 and the ring gear 27 in a rotatable and revolvable manner.

The sun gears 22 and 26 are connected to rotate integrally, and the carrier 25 is connected with the ring gear 27 to rotate integrally. The carrier 25 and the ring gear 27 are connected with an output shaft 30 of the transmission 19. The transmission 19 further comprises engagement devices for connecting, disconnecting and fixing the rotary elements such as the gears and the carriers. Here, both types, i.e., hydraulic and electromagnetic engagement devices may be used, however, a hydraulic engagement device is used in this example. Specifically, there are provided a clutch C1 connecting and releasing the ring gears 10 and 23, and a clutch C2 connecting the ring gear 10 with the sun gears 22 and 26, and releasing the ring gear 10 from the sun gears 22 and 26. Also, there are provided a brake B1 for controlling a rotation and a cessation of the sun gears 22 and 26, and a brake B2 for controlling a rotation and a cessation of the carrier 29.

Figure 3:
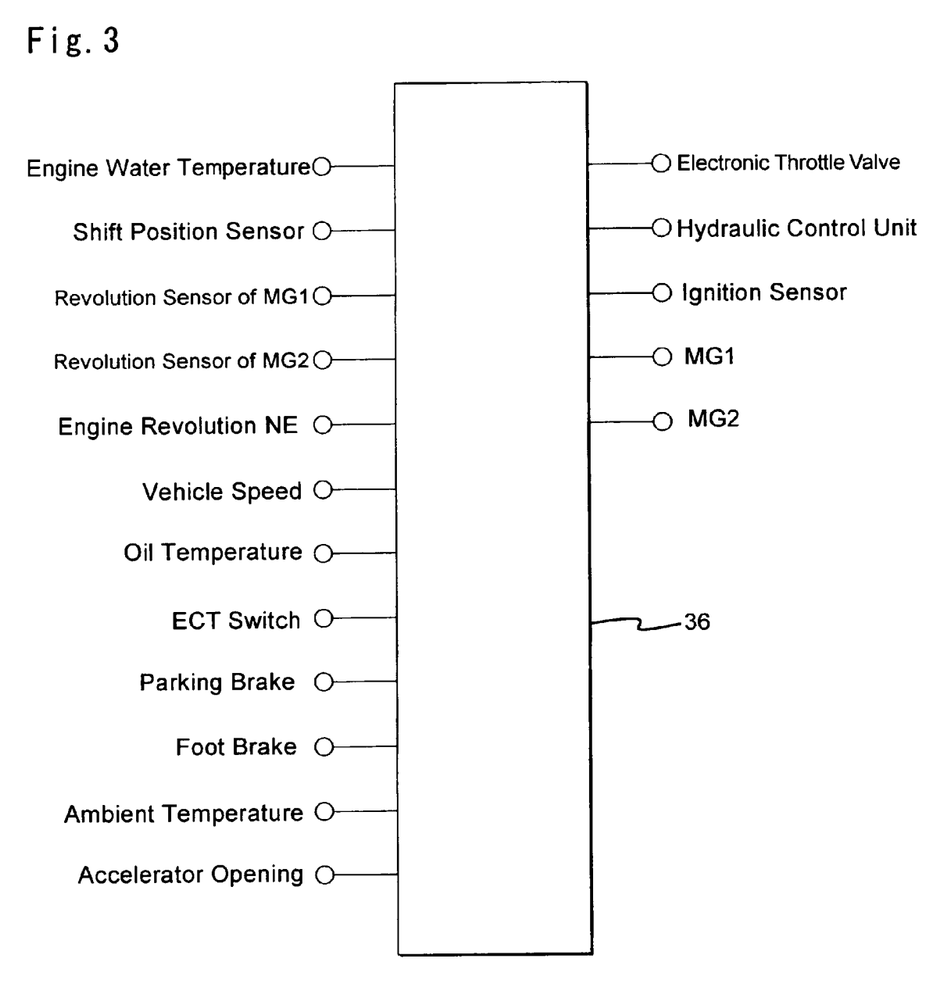
FIG. 3 is a schematic diagram showing signals inputted to an electronic control unit of the vehicle shown in FIG. 2, and signals outputted therefrom.

Next, a control line of the vehicle 1 will be explained hereinafter. There are provided an electric storage device 31 exchanging electric power with the motor generator 3, and an inverter 32 for controlling the motor generator 3. Also, there are provided an electric storage device 33 exchanging electric power with the motor generator 16, and an inverter 34 for controlling the motor generator 16. A secondary battery, more specifically, a battery, a capacitor and so on can be used as the electric storage devices 31 and 33. Further, there is provided a hydraulic control unit 35 functioning as an actuator to control the clutches C1 and C2 and the brakes B1 and B2 of the transmission 19. The hydraulic control unit 35 is a known unit comprising a hydraulic circuit, a solenoid valve and so on. Also, there is provided an electronic control unit 36 for controlling the engine 2, the invertors 32 and 34, and the hydraulic control unit 35. As shown in FIG. 3, a signal from a shift position sensor, a signal from an engine water temperature sensor, signals from a revolution sensors of the motor generators 3 and 16, a signal from an engine revolution sensor, a signal from a vehicle speed sensor, a signal from an ambient temperature sensor, a signal from an oil temperature sensor, a signal from an ECT switch, a signal from a parking brake switch, a signal from a foot brake switch, a signal from an accelerator opening sensor and so on are inputted to the electronic control unit 36. On the other hand, a signal for controlling an electronic throttle valve of the engine 2, a signal for controlling a fuel injection device of the engine 2, a signal for controlling an ignition device of the engine 2, signals for controlling the motor generators 3 and 16 through the invertors 32 and 34, a signal for controlling the hydraulic control unit 35 and so on are outputted from the electronic control unit 36.

Next, here will be explained a control of the vehicle 1. The engine torque is transmitted to the carrier 12 of the power distribution mechanism 8 through the input shaft 14 by driving the engine 2, and the engine torque is outputted from the ring gear 10 of the power distribution mechanism 8 by establishing a reaction force against the engine torque by the motor generator 16. A speed change ratio of the power distribution mechanism 8 can be controlled steplessly (i.e., continuously) by controlling a rotational direction (i.e., forward and backward) of the motor generator 16, and by controlling an operating state thereof between a motor and a generator. Specifically, the carrier 12 functions as an input element, the sun gear 9 functions as a reaction element, and the ring gear 10 functions as an output element. In this situation, the power distribution mechanism 8 functions as a continuously variable transmission as a result of a differential action performed by the carrier 12, the sun gear 9 and the ring gear 10. For example, the speed change ratio of the power distribution mechanism 8 can be controlled by the following method. First of all, a drive demand is obtained on the basis of an opening degree of an accelerator and a vehicle speed, and a target engine output is obtained on the basis of the drive demand. In order to achieve the target engine output, an operating condition of the engine 2 is determined in line with an optimum fuel economy curve, and a target engine revolution and a target engine torque are obtained. Then, the speed change ratio of the power distribution mechanism 8, more specifically, an input revolution is controlled to approximate an actual engine revolution to the target engine revolution. Also, an opening degree of an electronic throttle valve or the like is controlled to approximate the actual engine torque to the target engine torque.

Figure 4:
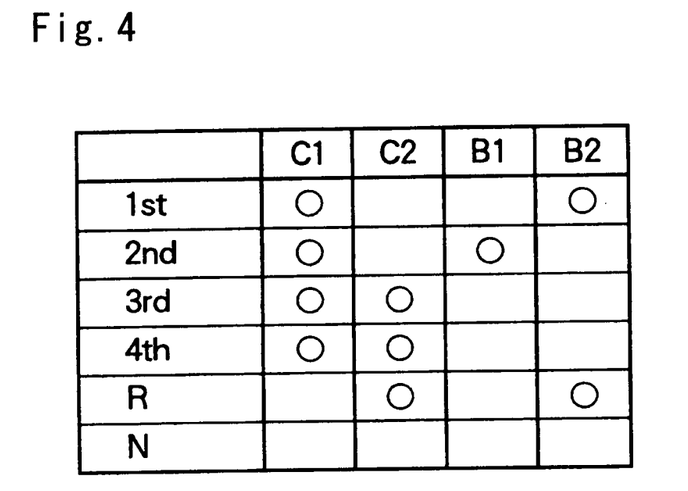
FIG. 4 is a table showing operating states of the engagement devices in each gear stage of D position and R position of the transmission shown in FIG. 2.

A shift position for controlling the transmission 19 can be selected from e.g., P (i.e., parking) position, R (i.e., reverse) position, N (i.e., neutral) range and D (i.e., drive) position. For example, in case D position is selected in the transmission 19 shown in FIG. 2, the gear stage of the transmission 19 can be shifted selectively within a first (1st) stage, a second (2nd) stage, a third (3rd) stage and a fourth (4th) stage. In order to shift the gear stage selectively, a speed change map for determining the gear stage according to a vehicle speed and an opening degree of the accelerator is stored in the electronic control unit 36. Control states of the clutch mechanisms under each gear stage of D position, and also N and R positions are indicated in FIG. 4. In FIG. 4, "○" in a column represents an engagement of the corresponding engagement devices, and a blank column represents a state where the corresponding engagement device is released. Specifically, in case of setting the first stage, the clutch C1 and the brake B2 are engaged, and the clutch C2 and the brake B1 are released. In case of setting the second stage, the clutch C1 and the brake B1 are engaged, and the clutch C2 and the brake B2 are released. In case of setting the third or fourth stage, both of the clutches C1 and C2 are engaged, and both of the brakes B1 and B2 are released.

Here, in case of setting the third or fourth stage, the control contents for the transmission 19 are identical in both cases, however, different controls are carried out for the power distribution mechanism 8 in each case. Details of such differences will be explained later. In case of setting R position, the clutch C2 and the brake B2 are engaged, and the clutch C1 and the brake B1 are released. In case N or P position is selected, all of the engagement devices are released.

Figure 5:
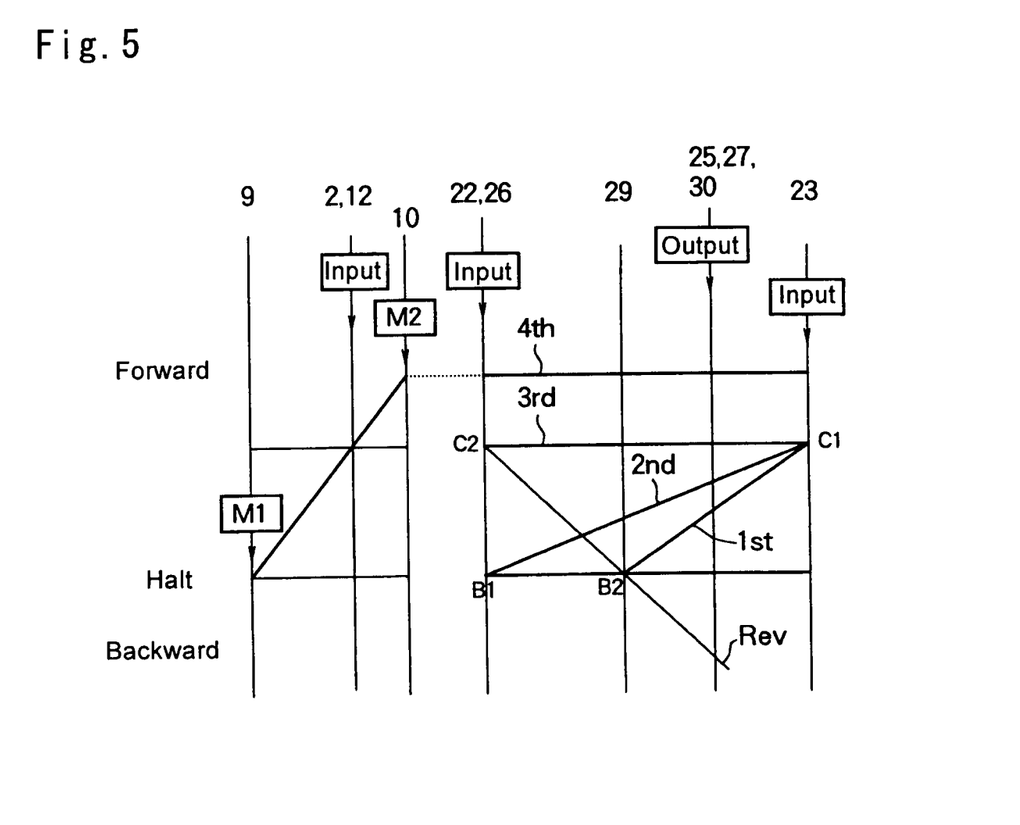
FIG. 5 is a nomographic diagram showing shift positions set by the power distribution mechanism and the transmission shown in FIG. 2.

Next, statuses of the rotary elements of the transmission 19 under D position will be explained with reference to FIG. 5. In the part of FIG. 5 representing the power distribution mechanism 8, an ordinate axis of the carrier 12 (i.e., an engine 2) is situated between axes of the motor generators 3 and 16. In FIG. 5, "Forward" means a forward rotation, and "Backward" means a backward direction. Here, the "forward direction" means a rotational direction of the engine 2. In case the first stage is selected, the clutch C1 is engaged, and at least one of the torques of the engine 2 and the motor generator 3 is inputted to the ring gear 28 of the transmission 19. In this case, the carrier 29 halted by engaging the brake B2 functions as a reaction element, and the torques outputted from the carrier 25 and the ring gear 27 are transmitted to the output shaft 30. Consequently, the wheel 5 is driven by the torque of the output shaft 30 transmitted to through the differential 4. In case the first stage is thus selected, revolution frequencies of the ring gear 27 and the carrier 25 are lower than that of the ring gear 23. That is, a speed change ratio of the transmission 19 is larger than "1".

In case the second stage is selected, the clutch C1 and the brake B1 are engaged. Therefore, at least one of the torques of the engine 2 and the motor generator 3 is inputted to the ring gear 28 of the transmission 19. In this case, the halted sun gear 22 functions as a reaction element, and the torque outputted from the carrier 25 is transmitted to the output shaft 30. In case the second stage is thus selected, a revolution frequency of the carrier 25 is lower than that of the ring gear 23. That is, a speed change ratio of the transmission 19 is larger than "1". Here, provided that the input revolution is constant, the revolution frequency of the carrier 25 under the first gear stage is lower than that under the second stage. This means that the speed change ratio of the case in which the first stage is set is larger than that of the case in which the second stage is set.

In case the third or fourth stage is selected, both of the clutches C1 and C2 are engaged, therefore, all of the rotary members constituting the first and the second planetary gear transmission mechanisms 20 and 21 are rotated integrally. That is, in case the third or fourth stage is set, the speed change ratio of the transmission 19 is "1". In other wards, the input rotary element and the output rotary element of the transmission 19 are connected directly. Here, a difference between the third stage and the fourth stage is that the motor generator 16 of the power distribution mechanism 8 will not be halted in case of setting the third stage, but it will be halted, i.e., the revolution frequency thereof is zero in case of setting the fourth stage. In case R position is selected, the clutch C2 is engaged, therefore, the sun gear 26 functions as an input element and the carrier 29 functions as a reaction element. Consequently, the ring gear 27 is rotated backwardly. Here, the nomographic diagram of FIG. 5 shows a case in which the revolution frequency of the engine 2 is constant.

In the vehicle 1 as thus far explained, a cranking of the engine 2 can be carried out by at least one of the torques of the motor generator 13 and 16 when starting the engine. Here will be explained a control method of starting the engine 2 with reference to a flowchart of FIG. 1. First of all, it is judged whether or not a starting condition of the engine 2 is satisfied (at Step S1). At Step S1, for example, the starting condition of the engine 2 is judged from a signal of an ignition switch. In case the starting condition of the engine 2 is satisfied so that the answer of Step S1 is YES, it is judged whether or not the shift position is in D position (at Step S2). In case the answer of Step S2 is NO, it is judged whether or not the shift position is in N position or P position (at Step S3).

Figure 1:
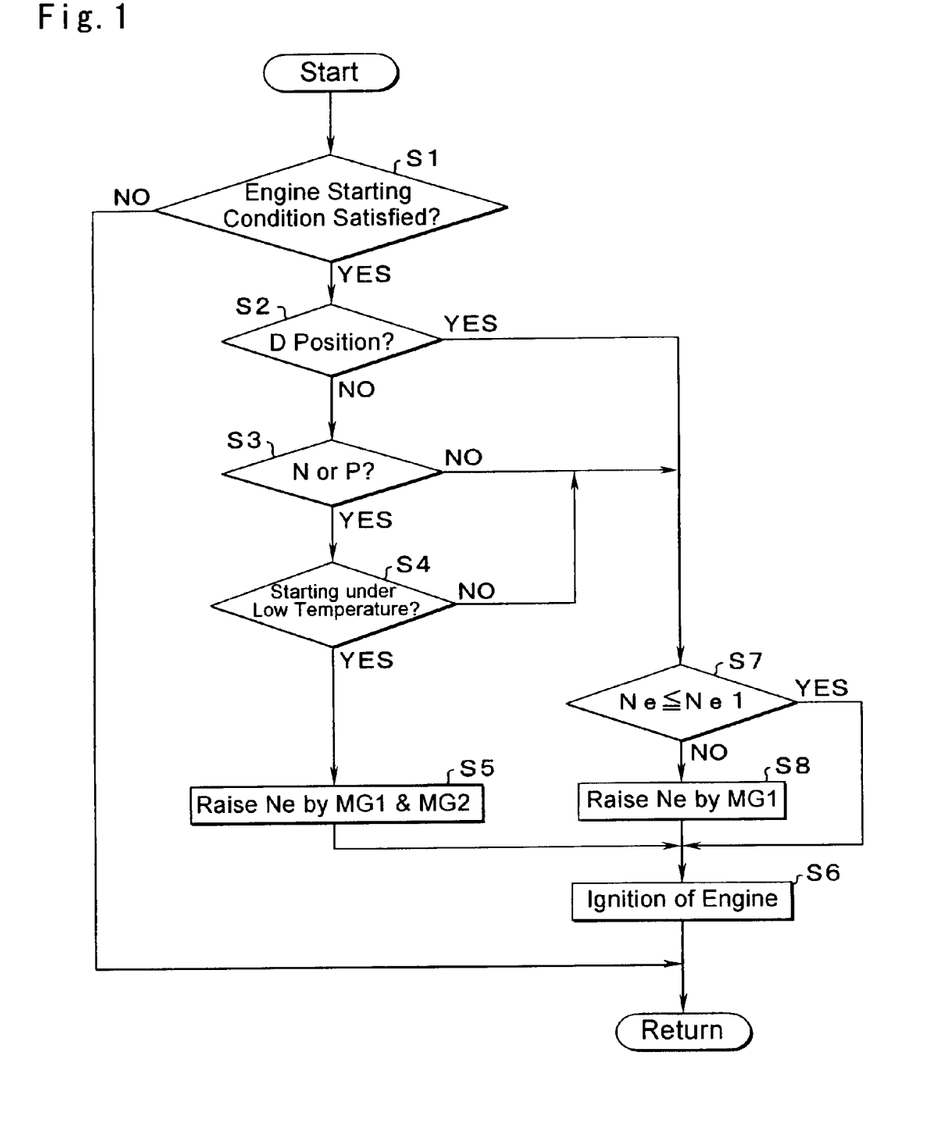
FIG. 1 is a flowchart showing a control method carried out by the starting control system for engines of the invention.

In case the answer of Step S3 is YES, then, it is judged whether or not a starting condition under low temperature is satisfied (at Step S4). The starting condition under low temperature is satisfied in case an ambient temperature is lower than a predetermined degree, and the starting condition of the engine is satisfied. In case the answer of Step S4 is YES, the electric powers outputted from the electric storage devices 31 and 33 may be restricted (to a small power). If a cranking of the engine 2 is carried out by the torque of any of the motor generators 3 and 16 when the electric powers to be supplied to the motor generators 3 and 16 is thus restricted, it may take a long time for the engine 2 to reach the revolution where the engine 2 can rotate autonomously. Here, the required revolution frequency to rotate the engine 2 autonomously will be explained later. In this situation, a resonance may occur and a noise may be generated in the power transmission route from the motor generator 3 or 16 to the engine 2. The resonance is a vibration mode caused mainly by a torsional vibration.

In case the answer of Step S4 is YES, a control to raise a revolution frequency of the engine 2 is carried out (at Step S5). Specifically, both of the motor generators 3 and 16 are rotated in the forward direction to function as motors, and both torques of the motor generators 3 and 16 are transmitted to the engine 2 through the input shaft 14 and the damper mechanism 15 to crank the engine 2. When the control of Step S5 is thus carried out, all of the motor generators 3 and 16, the input shaft 14 and the power distribution mechanism 8 are rotated as an inertial mass. As a result, a load to start the engine 2 is lightened, and a rotational band where the resonance occurs is shifted to lower band. That is, it is possible to prevent the revolution frequency of the input shaft 14 to stay in the resonance point when carrying out a cranking of the engine 2. Here, the resonance point depends on the structural features and conditions of the engine 2. For example, resonance point depends on the number of cylinders, arrangement of cylinders, i.e., whether the engine is V type or horizontal opposed type, the number of cycles, i.e., whether the engine is four cycle engine or two cycle engine, a type of fuel, i.e., whether the fuel to be used is gasoline or light oil and so on. As explained above, both of the clutches C1 and C2 are released under N position and P position, that is, the torques of the motor generators 3 and 16 will not be transmitted to the wheel 5. Therefore, a driving force will not be generated under N position and P position. Subsequent to Step S5, when the revolution frequency of the engine 2 exceeds the revolution where the engine 2 can rotate autonomously, a fuel injection control and an ignition control are carried out to rotate the engine 2 autonomously (at Step S6). Then, the routine is returned. In case the engine 2 is a diesel engine, the ignition control at Step S6 of the example is omitted and the engine 2 ignites itself.

To the contrary, in case the answer of Step S4 is NO, it is judged whether or not the actual engine revolution Ne is lower than a revolution Ne1 where the engine 2 can rotate autonomously (at Step S7). Specifically, the revolution Ne1 is the revolution where the engine 2 can rotate autonomously when the fuel is fed thereto and combusted. In case the answer of Step S7 is NO, the motor generator 16 is operated as a motor and the torque thereof is transmitted to the engine 2 to carry out a cranking of the engine 2 (at Step S8). Then, the routine advances to Step S6. Thus, the outputs of the electric storage devices 31 and 33 are not restricted in case the answer of Step S4 is NO. This means that a resonance unlikely to occur in the power transmission route from the power distribution mechanism 8 to the engine 2. Therefore, the cranking of the engine 2 can be carried out only by the motor generator 16. Meanwhile, in case R position is selected at Step S3, the answer of Step S3 is NO and the routine advances to Step S7. In case the answer of Step S2 is YES, the routine advances to Step S7. In case the answer of Step S7 is YES, the routine advances to Step S6. In case the answer of Step S1 is NO, the routine is returned.

Figure 6:
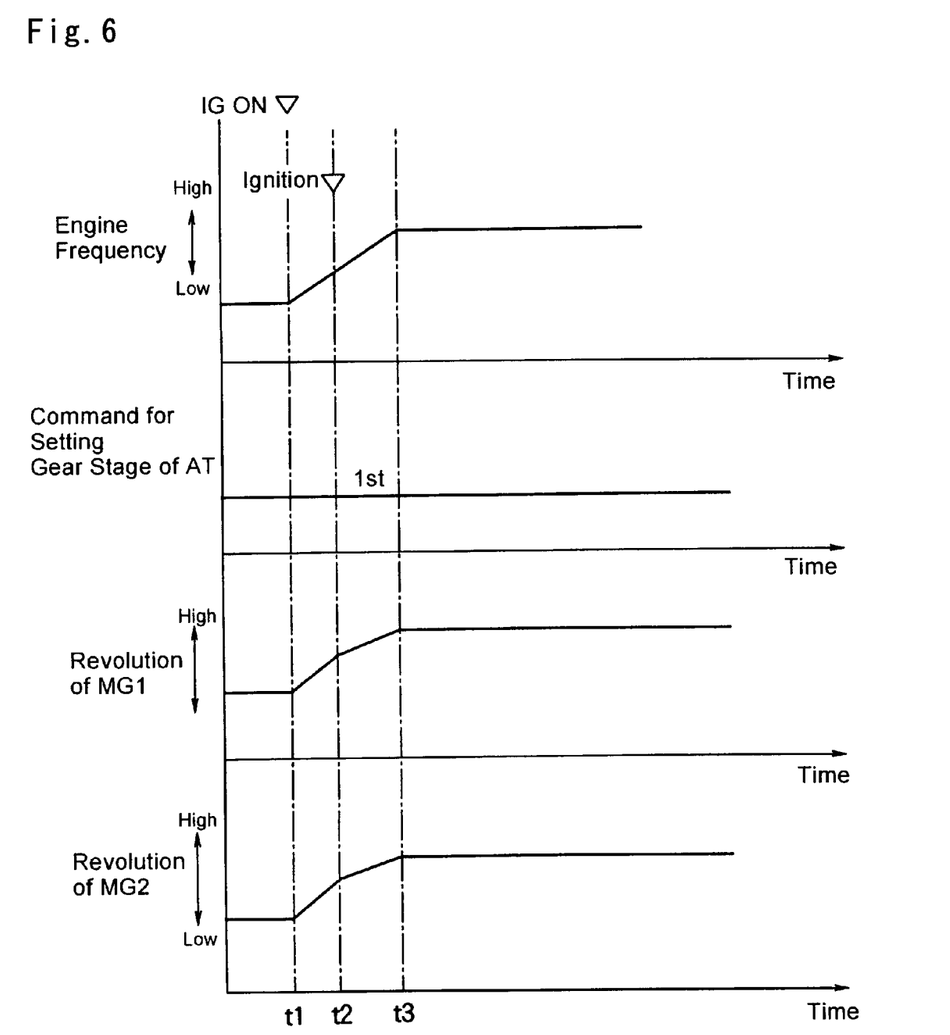
FIG. 6 is a time chart of the case of starting the engine by the present invention.

Next, here will be explained statuses of rotary elements in case the routine advances to Step S6 via Steps S1, S7 and S8 and to start the engine 2. More specifically, here will be explained a case of starting the engine 2 when the first stage is set under D position. For example, in case the torque of the motor generator 3 or a kinetic energy resulting from a coasting of the vehicle 1 is being transmitted to the engine 2 through the transmission 19 and the power distribution mechanism 8 so that the engine 2 is idling when the vehicle 1 is running, the revolution frequency of the engine 2 can be raised by rotating the motor generator 16 in the forward direction to use as a motor and raising the revolution frequency thereof. In this case, a reaction torque is established by the motor generator 3. FIG. 6 is a time chart showing the case in which the routine advances to Step S6 via Steps S1, S7 and S8. First of all, the starting condition of the engine 2 has not yet been satisfied before the time t1, and a speed change command to set the first stage of the transmission 19 (i.e., the geared transmission) is being outputted. When the starting condition of the engine 2 is satisfied at the time t1, the revolution frequencies of the motor generator 16 and the idling engine 2 are raised. In this situation, the vehicle speed is increased so that the revolution frequency of the motor generator 3 is also raised. Then, at the time t2, the revolution frequency of the engine 2 reaches the revolution where the engine 2 can rotate autonomously, and an ignition control is carried out. After the time t3, the revolution frequencies of the engine 2 and the motor generators 3 and 16 are generally constant. Additionally, the engine 2 can be started in the same way even in case the gear stage of the transmission 19 is the second, third or fifth stage.

Here will be explained a case in which the routine advances to Step S6 via Steps S3, S7 and S8. In other words, here will be explained a case of starting the engine 2 under R position. Specifically, in case R position is selected, the brake B2 is engaged to halt the carrier 29. As a result, the output shaft 30 is allowed to be rotated backwardly. In this case, if the motor generator 3 is rotated as a motor in the forward direction, the vehicle 1 is driven backwardly. In case of starting the idling engine 2 in this situation, the revolution frequency of the engine 2 is raised by rotating the motor generator 16 as a motor in the forward direction and raising the revolution frequency thereof. In this case, the reaction torque against the motor generator 16 is established by the motor generator 3.

Figure 7:
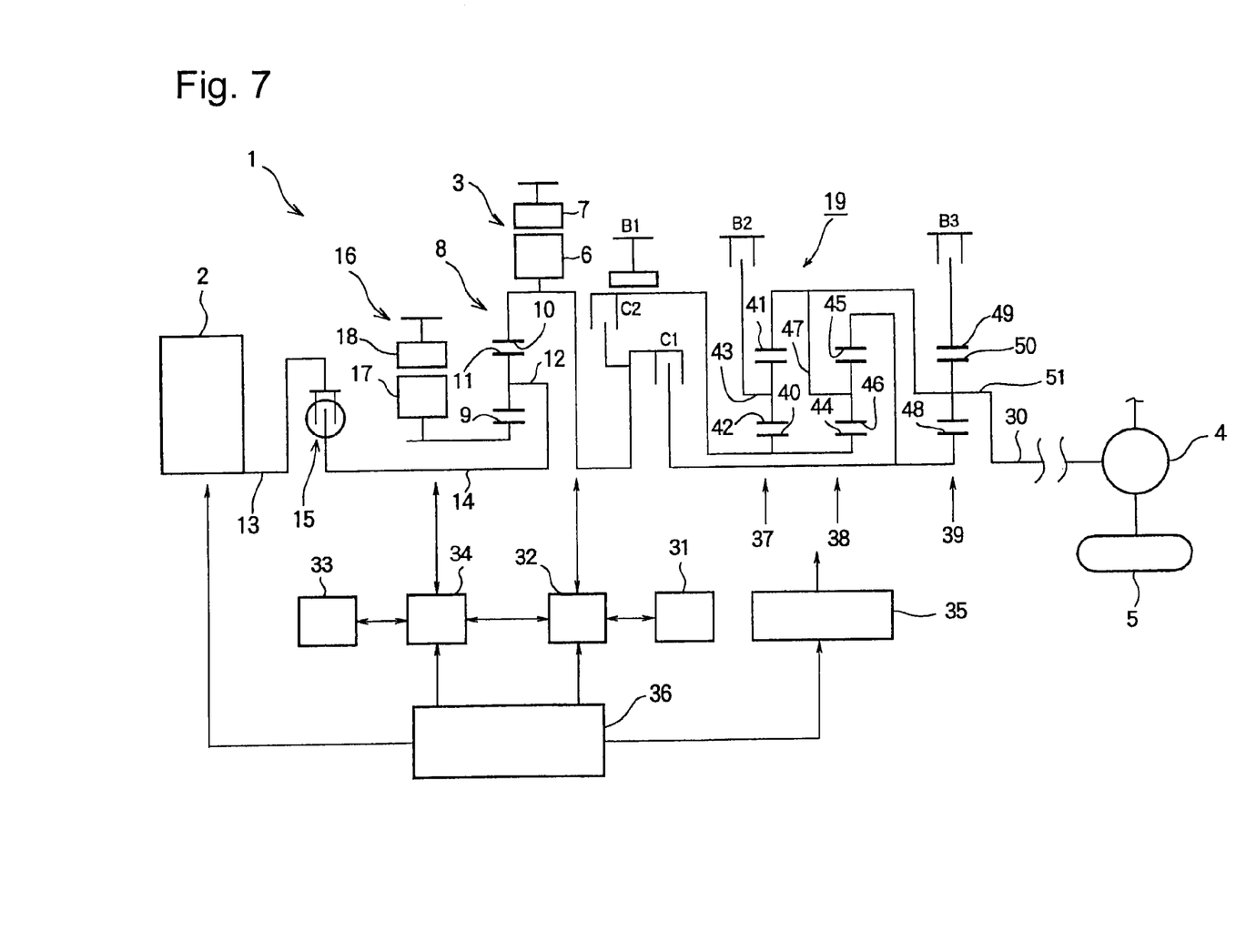
FIG. 7 is a schematic diagram showing another example of a power train of a hybrid vehicle and a control line thereof to which the invention is applied.

Next, here will be explained another example of the transmission 19. The transmission 19 is a geared transmission capable of controlling a ratio between an input revolution and an output revolution, i.e., a gear stage thereof stepwise (i.e., discontinuously). The transmission 19 comprises a first planetary gear transmission mechanism 37, a second planetary gear transmission mechanism 38 and a third planetary gear transmission mechanism 39. The first planetary gear transmission mechanism 37 is a single pinion type planetary gear mechanism comprising: a sun gear 40 and a ring gear 41 arranged coaxially; and a carrier 43, which holds a pinion gear 42 meshing with the sun gear 40 and the ring gear 41 in a rotatable and revolvable manner. The second planetary gear mechanism 38 is also a single pinion type planetary gear mechanism comprising: a sun gear 44 and a ring gear 45 arranged coaxially; and a carrier 47, which holds a pinion gear 46 meshing with the sun gear 44 and the ring gear 45 in a rotatable and revolvable manner. The third planetary gear mechanism 39 is also a single pinion type planetary gear mechanism comprising: a sun gear 48 and a ring gear 49 arranged coaxially; and a carrier 51, which holds a pinion gear 50 meshing with the sun gear 48 and the ring gear 49 in a rotatable and revolvable manner.

The sun gears 40 and 44 are connected to rotate integrally, the carriers 47 and 51 and the ring gear 41 are connected to rotate integrally, and the ring gear 45 and the sun gear 48 are connected to rotate integrally. The carriers 47 and 51 and the ring gear 41 are connected with an output shaft 30 of the transmission 19. The transmission 19 further comprises engagement devices for connecting, disconnecting and fixing rotary elements such as the gears and the carriers. Here, both types, i.e., hydraulic and electromagnetic engagement devices may be used, however, a hydraulic engagement device is used in this example. Specifically, there are provided a clutch C1 connecting and releasing the ring gear 10 with the ring gear 45 and the sun gear 48, and a clutch C2 connecting the ring gear 10 with the sun gears 40 and 44, and releasing the ring gear 10 from the sun gears 40 and 44. Also, there are provided a brake B1 for controlling a rotation and a cessation of the sun gears 40 and 44, a brake B2 for controlling a rotation and a cessation of the carrier 43, and a brake B3 for controlling a rotation and a cessation of the ring gear 49. The remaining structures of FIG. 7 are identical to those of the example shown in FIG. 2.

Figure 8:
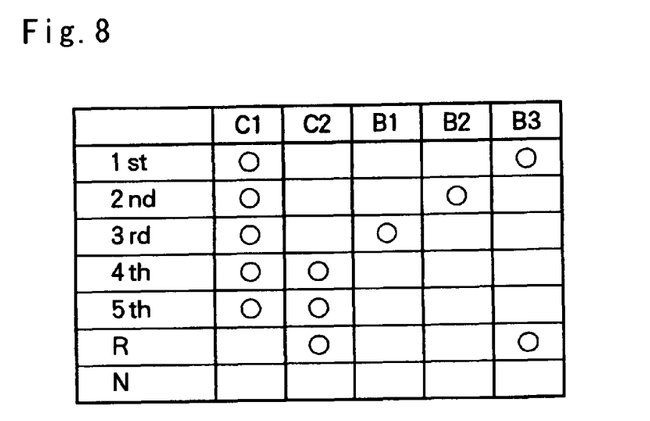
FIG. 8 is a table showing operating states of the engagement devices in each gear stage of D position and R position of the transmission shown in FIG. 7.

A shift position for controlling the transmission 19 shown in FIG. 7 can be selected from P (i.e., parking) position, R (i.e., reverse) position, N (i.e., neutral) position and D (i.e., drive) position. For example, in case D position is selected in the transmission 19 shown in FIG. 9, the gear stage of the transmission 19 can be shifted selectively within a first (1st) stage, a second (2nd) stage, a third (3rd) stage a fourth (4th) stage, and a fifth (5th) stage. Control states of the clutch mechanisms under each gear stage of D position, and also N and R position are indicated in FIG. 8. In FIG. 8, "○" in a column represents an engagement of the corresponding engagement devices, and a blank column represents a state where the corresponding engagement device is released. Specifically, in case of setting the first stage, the clutch C1 and the brake B3 are engaged, and the clutch C2 and the brakes B1 and B2 are released. In case of setting the second stage, the clutch C1 and the brake B2 are engaged, and the clutch C2 and the brakes B1 and B3 are released. In case of setting the third stage, the clutch C1 and the brake B1 are engaged, and the clutch C2 and the brakes B2 and B3 are released. In case of setting the fourth or fifth stage, both of the clutches C1 and C2 are engaged, and all of the brakes B1, B2 and B3 are released. Here, in case of setting the fourth or fifth stage, the control contents for the transmission 19 are identical in both cases, however, different controls are carried out for the power distribution mechanism 8 in each case. Details of such differences will be explained later. In case of setting R position, the clutch C2 and the brake B3 are engaged, and the clutch C1 and the brakes B1 and B2 are released. In case N or P position is selected, all of the engagement devices are released.

Figure 9:
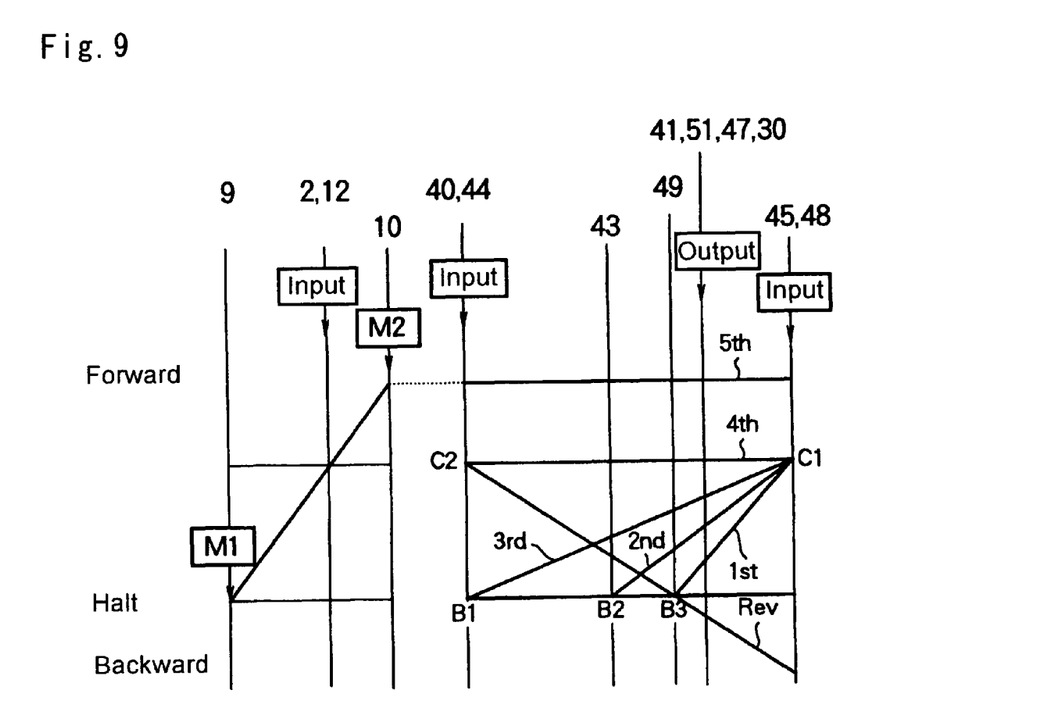
FIG. 9 is a nomographic diagram showing shift positions set by the power distribution mechanism and the transmission shown in FIG. 7.

Next, statuses of the rotary elements of the transmission 19 under D position will be explained with reference to FIG. 9. In FIG. 9, "Forward" means a forward rotation, and "Backward" means a backward rotation. In case the first stage is selected, the clutch C1 is engaged, and at least one of the torques of the engine 2 and the motor generator 3 is inputted to the sun gear 48 of the transmission 19. In this case, the ring gear 49 halted by engaging the brake B3 functions as a reaction element, and the torque outputted from the carrier 51 is transmitted to the output shaft 30. In case the first stage is thus selected, revolution frequency of the carrier 51 is lower than that of the sun gear 48. That is, a speed change ratio of the transmission 19 is larger than "1".

In case the second stage is selected, the clutch C1 and the brake B2 are engaged. Therefore, at least one of the torques of the engine 2 and the motor generator 3 is inputted to the ring gear 45 of the transmission 19. In this case, the halted carrier 43 functions as a reaction element, and the torque outputted from the carrier 51 is transmitted to the output shaft 30. In case the second stage is thus selected, a revolution frequency of the carrier 51 is lower than that of the ring gear 45. That is, a speed change ratio of the transmission 19 is larger than "1". Here, provided that the input revolution is constant, the revolution frequency of the carrier 51 under the first gear stage is lower than that under the second stage. This means that the speed change ratio of the case in which the first stage is set is larger than that of the case in which the second stage is set.

In case the third stage is selected, the clutch C1 and the brake B1 are engaged. Therefore, at least one of the torques of the engine 2 and the motor generator 3 is inputted to the ring gear 45 of the transmission 19. In this case, the halted sun gear 44 functions as a reaction element, and the torque outputted from the carrier 51 is transmitted to the output shaft 30. In case the third stage is thus selected, a revolution frequency of the carrier 51 is lower than that of the ring gear 45. That is, a speed change ratio of the transmission 19 is larger than "1". Here, provided that the input revolution is constant, the revolution frequency of the carrier 51 under the second gear stage is lower than that under the third stage. This means that the speed change ratio of the case in which the second stage is set is larger than that of the case in which the third stage is set.

In case the fourth or fifth stage is selected, all of the rotary members constituting the first to third planetary gear transmission mechanisms 37 to 39 are rotated integrally. That is, in case the fourth or fifth stage is set, the speed change ratio of the transmission 19 is "1". In other wards, the input rotary element and the output rotary element of the transmission 19 are connected directly. Here, a difference between the fourth stage and the fifth stage is that the motor generator 16 of the power distribution mechanism 8 will not be halted in case of setting the fourth stage, but it will be halted, i.e., the revolution frequency thereof is zero in case of setting the fifth stage. In case R position is selected, the clutch C2 and the brake B3 are engaged, therefore, the sun gear 44 functions as an input element and the ring gear 49 functions as a reaction element. Consequently, the carrier 51 is rotated backwardly. Here, the nomographic diagram of FIG. 8 shows a case in which the revolution frequency of the engine 2 is constant. The control method of FIG. 1 can also be carried out in the vehicle 1 having the transmission 19 shown in FIG. 7, and similar advantages can also be achieved.

Figure 10:
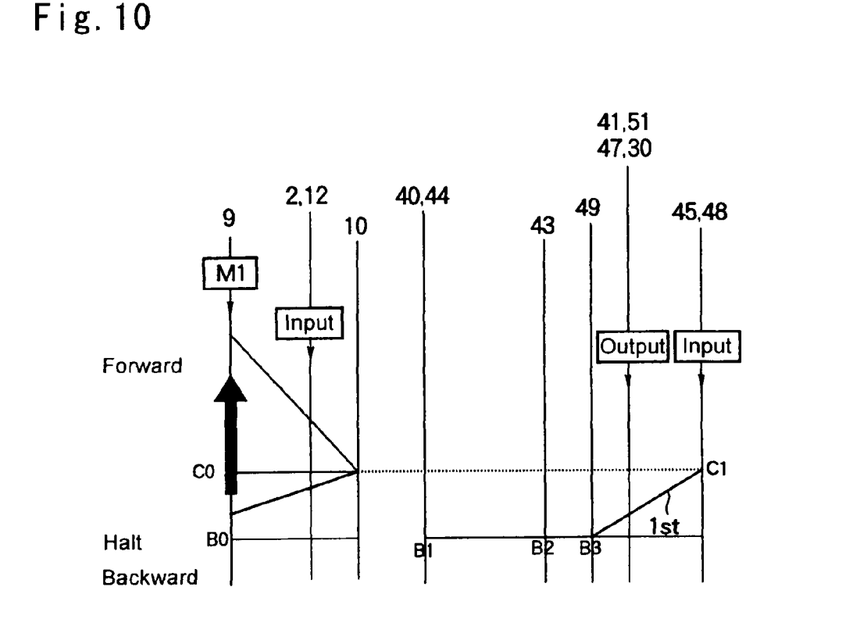
FIG. 10 is a nomographic diagram of a case where D position is selected in the power distribution mechanism and the transmission shown in FIG. 7, and the engine is started.

FIG. 10 is a nomographic diagram showing a case of cranking the engine 2 by the torque of the motor generator 16 under the first stage of D position. Specifically, the brake B3 is engaged to halt the ring gear 49, and the clutch C1 is engaged to rotate the motor generator 3 and the sun gear 48 integrally. In this case, if the starting condition of the engine 2 is satisfied when the output shaft 30 is rotating in the forward direction and the engine 2 is idling, the motor generator 16 is rotated in the forward direction to function as a motor so as to carry out a cranking of the engine 2.

Figure 11:
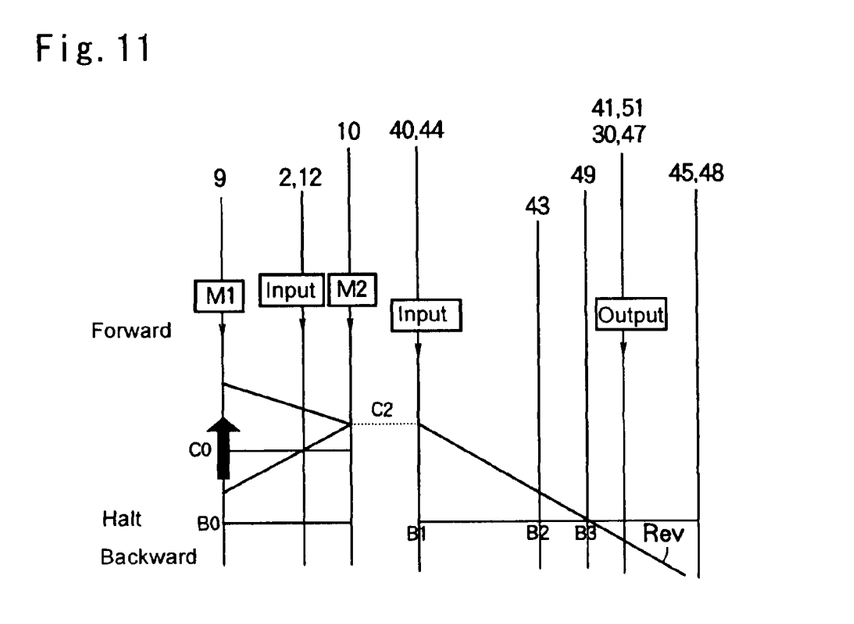
FIG. 11 is a nomographic diagram of a case where R position is selected in the power distribution mechanism and the transmission shown in FIG. 7, and the engine is started.

FIG. 11 is a nomographic diagram showing a case of cranking the engine 2 under R position. Specifically, the brake B3 is engaged to halt the ring gear 49, and the output shaft 30 is rotating backwardly. Also, the clutch C2 is engaged to rotate the motor generator 3 in the forward direction, and the engine 2 is idling. In this case, when the starting condition of the engine 2 is satisfied, the motor generator 16 is rotated in the forward direction to function as a motor so as to carry out a cranking of the engine 2.

In case of starting the engine 2 under low temperature, the control of FIG. 1 is carried out to control which torque of the motor generators 3 and 16 is to be transmitted to the engine 2, so as to prevent an occurrence of a resonance in the power transmission route including the input shaft 14. More specifically, an occurrence of a resonance and a generation of a noise are prevented when starting the engine 2 by increasing an inertia moment or an inertia torque of the power transmission route from the motor generators 3 and 16 to the engine 2 by driving both of the motor generators 3 and 16 as motors. As explained above, the motor generator 16 has a function to start the engine 2, and a function to control a speed change ratio of the power distribution mechanism 8. Here, the power distribution mechanism 8 is constructed of a planetary gear mechanism, that is, an inertia moment or an inertia torque of the power transmission route can be adjusted arbitrarily by varying a ratio between the revolutions of the rotary members (by changing designs of gears). Therefore, a resonance and a vibration in the power transmission route can be prevented more certainly. Further, the engine 2 is thus arranged between the motor generators 3 and 16 in the nomographic diagram showing more than three rotary elements of the planetary gear mechanism constituting the power distribution mechanism 8. Therefore, the engine 2 can be started by driving both of the motor generators 3 and 16. For this reason, the inertia moment of the power transmission system can be increased so that the resonance and the vibration in the power transmission system can be prevented more certainly.

Here will be explained a corresponding relation between the examples illustrated in FIGS. 2 and 7 and the invention. The motor generators 3 and 16 correspond to the electric motor and the starting device of the invention; the engine 2 corresponds to the engine of the invention; the wheel 5 corresponds to the wheel of the invention; the power distribution mechanism 8 corresponds to the first transmission unit of the invention; the transmission 19 corresponds to the second transmission unit of the invention; and the clutches C1 and C2, and the brakes B1 and B2 correspond to the clutch mechanisms and the engagement devices of the invention. Also, the clutch C1 corresponds to the first clutch of the invention; the clutch C2 corresponds to the second clutch of the invention; the brake B1 corresponds to the first brake of the invention; the brake B2 corresponds to the second brake of the invention; and the brake B3 corresponds to the third brake of the invention. Further, the power distribution mechanism 8, the input shaft 14 and the damper mechanism 15 correspond to the "power transmission route from the starting device to the engine" of the invention; the power distribution mechanism 8 corresponds to the continuously variable transmission of the invention; the sun gear 9, the ring gear 10 and the carrier 12 correspond to the "more than three rotary elements" and the "planetary gear mechanism" of the invention. Corresponding relations between FIGS. 1, 2 and 7 and the invention will also be explained hereinafter. The electronic control unit 36 for carrying out the controls of Steps S1, S2, S3, S4 and S5 in FIG. 1 corresponds to the starting device control means of the invention. Additionally, the continuously variable transmission constituting the power distribution mechanism is an electrical continuously variable transmission in which a speed change ratio thereof is varied continuously by controlling an output of an electric motor.

In addition to above, although the single pinion type planetary gear mechanism is used as the power distribution mechanism 8, a double pinion type planetary gear mechanism may also be used as the power distribution mechanism.

In this case, rotary elements are connected to arrange the engine between two motor generators in a nomographic diagram. It is also possible to use a power distribution mechanism comprising four rotary elements, in which any of those rotary elements is switched to function as an input element, reaction element and an output element selectively. On the other hand, the transmission arranged on the route from the power distribution mechanism to the wheel may also be a geared transmission capable of setting five or more gear stages under D position. Additionally, it is also possible to use a transmission in which the gear stage thereof is controlled by a synchronizer mechanism. The above-mentioned geared transmission arranged on the route from the power distribution mechanism to the wheel may also be a continuously variable transmission capable of varying a ratio between an input revolution and an output revolution steplessly (i.e., continuously) such as a toroidal type or a belt type continuously variable transmission. The control example shown in FIG. 1 may also be applied to any of a front drive vehicle (or two wheel drive vehicles), in which an engine and two motor generators are connected to front wheels, and a front drive vehicle in which an engine and two motor generators are connected to rear wheels. Further, the control example shown in FIG. 1 may also be applied to a four wheel drive vehicle, in which an engine and two motor generators are connected to both front and rear wheels in a power transmittable manner. Lastly, according to the invention, any of a hydraulic clutch and an electromagnetic clutch may be used as the clutch mechanism.

INDUSTRIAL APPLICABILITY

The present invention can be utilized in a field of manufacturing and repairing automobiles such as cars, and in a field of manufacturing and processing parts for automobiles.

The invention claimed is:

1. A starting control system for starting an engine using electric motors, comprising:
 a starting device including a plurality of the electric motors for starting the engine; and
 a starting device controller that is configured to start the engine by the simultaneous application of the plurality of electric motors of the starting device.

2. The starting control system as claimed in claim 1, wherein:
 the starting device controller includes a controller that controls the starting device to prevent an occurrence of a resonance in a power transmission route from the starting device to the engine, when starting the engine under low temperature.

3. The starting control system as claimed in claim 1, wherein:
 the starting device controller includes a controller that increases an inertia moment in a power transmission route from the starting device to the engine, to prevent an occurrence of a resonance when starting the engine.

4. The starting control system as claimed in claim 1, wherein the starting device controller is configured to start the engine by the plurality of electric motors of the starting device under the condition in which a temperature is lower than a predetermined temperature so that output of an electric storage device is restricted.

5. The starting control system as claimed in claim 1, further comprising:
 a first transmission unit to which the torque is transmitted from the engine; and
 clutch mechanisms arranged downstream of the first transmission unit.

6. The starting control system as claimed in claim 5, wherein:
 the electric motors are connected with the first transmission unit in a power transmittable manner.

7. The starting control system as claimed in claim 5, wherein any one of the electric motors is arranged in a route between the first transmission unit and the clutch mechanism.

8. The starting control system as claimed in claim 5, further comprising:
 a second transmission unit arranged downstream of the first transmission unit; and wherein the second transmission unit includes the clutch mechanisms.

9. The starting control system as claimed in claim 8, wherein:
the first transmission unit includes a continuously variable transmission capable of controlling a speed change ratio thereof between an input revolution and an output revolution continuously by controlling outputs of the electric motors;
the starting device includes the continuously variable transmission; and
a speed change ratio of the second transmission unit between an input revolution and an output revolution thereof can be controlled by controlling torque capacities of the clutch mechanisms.

10. The starting control system as claimed in claim 9, wherein:
the continuously variable transmission includes a planetary gear mechanisms having rotary elements capable of rotating differentially among each other;
the electric motors are connected individually to the different rotary elements of the planetary gear mechanism; and
the starting device controller includes a controller that selects the electric motor for starting the engine to prevent an occurrence of a resonance when starting the engine.

11. The starting control system as claimed in claim 8, wherein:
the second transmission unit is constructed of two sets of planetary gear mechanisms, the plurality of engagement devices, and the clutch mechanisms.

12. The starting control system as claimed in claim 11, wherein:
the two sets of planetary gear mechanisms include a single pinion type planetary gear mechanism;
sun gears of the first and the second planetary gear mechanisms are connected with each other, and a carrier of the first planetary gear mechanism and a ring gear of the second planetary gear mechanism are connected with each other; and
the plurality of engagement devices include
a first clutch connecting a ring gear of the first planetary gear mechanism and an output element of a power distribution mechanism selectively;
a second clutch connecting the sun gear of the first planetary gear mechanism and the sun gear of the second planetary gear mechanism with the output element of the power distribution mechanism selectively;
a first brake fixing the sun gears of the first and the second planetary gear mechanisms selectively; and
a second brake fixing a carrier of the second planetary gear mechanisms selectively.

13. The starting control system as claimed in claim 8, wherein:
the second transmission unit is constructed of three sets of planetary gear mechanisms, a plurality of engagement devices, and the clutch mechanisms.

14. The starting control system as claimed in claim 13, wherein:
the planetary gear mechanisms include a single pinion type planetary gear mechanism;
sun gears of first and second planetary gear mechanisms are connected with each other; a ring gear of the first planetary gear mechanism, a carrier of the second planetary gear mechanism and a carrier of the third planetary gear mechanism are connected to one another; and a ring gear of the second planetary gear mechanism and a sun gear of the third planetary gear mechanism are connected with each other; and
the engagement device includes
a first clutch connecting the ring gear of the second planetary gear mechanism and the sun gear of the third planetary gear mechanism with an electrical continuously variable transmission unit selectively;
a second clutch connecting the sun gears of the first and second planetary gear mechanisms with the electrical continuously variable transmission unit selectively;
a first brake fixing the sun gears of the first and second planetary gear mechanisms selectively;
a second brake fixing a carrier of the first planetary gear mechanism selectively; and
a third brake fixing a ring gear of the third planetary gear mechanism selectively.

15. The starting control system as claimed in claim 8, wherein:
the first transmission unit includes an electrical continuously variable transmission in which a speed change ratio thereof is controlled electrically and varied continuously; and
the second transmission unit includes a geared transmission in which a gear stage thereof is changed stepwise.

16. The starting control system as claimed in claim 15, wherein:
the electrical continuously variable transmission and the geared transmission are connected in tandem so as to input power outputted from any one of those transmissions to the other one.

17. The starting control system as claimed in claim 15, wherein:
a total speed change ratio of the transmission units is set by both of the electrical continuously variable transmission and geared transmission.

18. The starting control system as claimed in 15, wherein:
the electrical continuously variable transmission includes a single pinion type planetary gear mechanism having a carrier functioning as an input element, a sun gear functioning as a reaction element, and a ring gear functioning as an output element.

19. A starting control system for starting an engine by an electric motor, comprising:
a starting device including a plurality of electric motors for starting the engine by the simultaneous application of the plurality of electric motors, and a planetary gear mechanism having a plurality of rotary elements rotating differentially among each other;
wherein the electric motors and the engine are connected individually to the different rotary elements of the planetary gear mechanism;
a judging means that judges a satisfaction of a starting condition of the engine under a predetermined low temperature at which electric powers supplied to the electric motors are restricted; and
a starting device control means that increases an inertia moment in a power transmission route from the starting device to the engine by starting the engine using the plurality of electric motors upon satisfaction of the starting condition of the engine under the predetermined low temperature, thereby shifting a rotational band where a resonance occurs to a lower band.

* * * * *